(12) United States Patent
Tajiri

(10) Patent No.: US 7,028,318 B2
(45) Date of Patent: Apr. 11, 2006

(54) OPTICAL HEAD WITH LENS HOLDER SUPPORTED BY SUSPENSION WIRES AT CENTRAL AND END PORTIONS

(75) Inventor: Noboru Tajiri, Gunma (JP)

(73) Assignee: Sanyo Electric Co., Ltd., Osaka (JP)

( * ) Notice: Subject to any disclaimer, the term of this patent is extended or adjusted under 35 U.S.C. 154(b) by 260 days.

(21) Appl. No.: 10/361,668

(22) Filed: Feb. 10, 2003

(65) Prior Publication Data

US 2003/0156529 A1    Aug. 21, 2003

(30) Foreign Application Priority Data

Feb. 15, 2002    (JP)    ............................. 2002-038297

(51) Int. Cl.
*G11B 7/09*    (2006.01)

(52) U.S. Cl. .................... 720/684; 720/685; 369/44.32

(58) Field of Classification Search ........ 720/682–687; 369/44.12–16; 359/819, 823, 824
See application file for complete search history.

(56) References Cited

U.S. PATENT DOCUMENTS

| | | | | |
|---|---|---|---|---|
| 5,241,528 A | * | 8/1993 | Mohri et al. ................ | 720/685 |
| 5,526,340 A | * | 6/1996 | Tanaka ........................ | 720/685 |
| 5,566,149 A | * | 10/1996 | Song ........................ | 369/44.15 |
| 6,016,292 A | * | 1/2000 | Lee .......................... | 369/44.15 |
| 6,034,940 A | * | 3/2000 | Lee .............................. | 720/685 |
| 6,091,553 A | * | 7/2000 | Song et al. ................. | 359/813 |
| 6,344,936 B1 | * | 2/2002 | Santo et al. ................ | 359/824 |
| 6,449,229 B1 | * | 9/2002 | Kim et al. ............... | 369/53.19 |
| 6,466,529 B1 | * | 10/2002 | Kim et al. ............... | 369/44.32 |
| 6,643,229 B1 | * | 11/2003 | Yamaguchi .............. | 369/44.11 |
| 6,724,696 B1 | * | 4/2004 | Kim et al. ............... | 369/44.16 |
| 6,768,601 B1 | * | 7/2004 | Ju .............................. | 359/824 |
| 2002/0006090 A1 | | 1/2002 | Kawano | |
| 2002/0041563 A1 | * | 4/2002 | Shinozuka et al. ......... | 369/244 |
| 2004/0004774 A1 | * | 1/2004 | Fujita ........................ | 359/814 |

FOREIGN PATENT DOCUMENTS

| | | |
|---|---|---|
| CN | 1335613 | 2/2002 |
| JP | 2000-293872 | 10/2000 |

* cited by examiner

*Primary Examiner*—Brian E. Miller
(74) *Attorney, Agent, or Firm*—Hogan & Hartson, L.L.P.

(57) ABSTRACT

Suspension wires (3*a*) and (3*c*) are fixed to and bridged over a lens holder (1) and a fixing member (11) which is fixed to the housing. On each of side surfaces of the lens holder (1) is mounted a tilt bobbin (8) onto which a tilt coil (9) is wound. A second suspension wire (3*b*) is fixed to and bridged over the tilt bobbin (8) and the fixing member (11).

5 Claims, 3 Drawing Sheets

OPTICAL HEAD WITH LENS HOLDER SUPPORTED BY SUSPENSION WIRES AT CENTRAL AND END PORTIONS

BACKGROUND OF THE INVENTION

1. Field of the Invention

The present invention relates to a suspension for supporting a lens holder which holds an objective lens in an optical head, and more particularly, to a structure of such suspension.

2. Description of the Related Art

An optical head has a function to optically read signals from signal recording media such as disks, or to optically write signals onto such signal recording media. The optical head is generally constructed by placing an actuator for driving an objective lens in a housing into which a light emitting element such as a semiconductor laser and a light receiving element such as an optical detector are incorporated.

A typical actuator comprises drive coils such as a focusing coil and a tracking coil provided in the lens holder for holding the objective lens and a magnet which is fixed to the housing. The lens holder is supported by the suspension to be displaceable with respect to the housing. The movement of the objective lens is controlled through interaction between the magnet and a magnetic field generated by the drive coils.

In recent years, linear suspensions in which linear members such as a wire and a leaf spring are utilized have come to be the most common suspensions used for actuators. A section near each ends of a plurality of linear members is respectively fixed to the housing side and to the objective lens side.

SUMMARY OF THE INVENTION

For disk players of the recently commercialized DVD-system, because the recording density for the disks of the DVD-system is high, the area of the laser beam incident on the disk for reading signals must be reduced compared to the conventional disks for CD-system and the optical axis of the laser beam must be set perpendicular to the disk surface.

The present invention was conceived in light of the problems associated with such configurations, and, according to one aspect of the present invention, there is provided an optical head comprising a suspension for supporting a lens holder, the suspension having first suspension wires directly fixed to the lens holder for supporting the lens holder and second suspension wires for supporting the lens holder via bobbins fixed to the lens holder.

On each side surface of the lens holder onto which the bobbin are fixed, a pair of projections can be provided in positions pinching the bobbin. In addition, recesses corresponding to the projections and into which fit the projections can be formed on the bobbin. With the projections and recesses, the bobbin can be precisely positioned with respect to the lens holder.

In the assembly process of the optical head, the bobbin is first fixed to the lens and then the second suspension wire is fixed to the bobbin. The bobbin can be fixed external to the drive coil which is directly provided on the lens holder.

It is also possible to configure so that power is supplied from the second suspension wire to the coil wound on the bobbin.

DESCRIPTION OF PREFERRED EMBODIMENT

Figure 1:
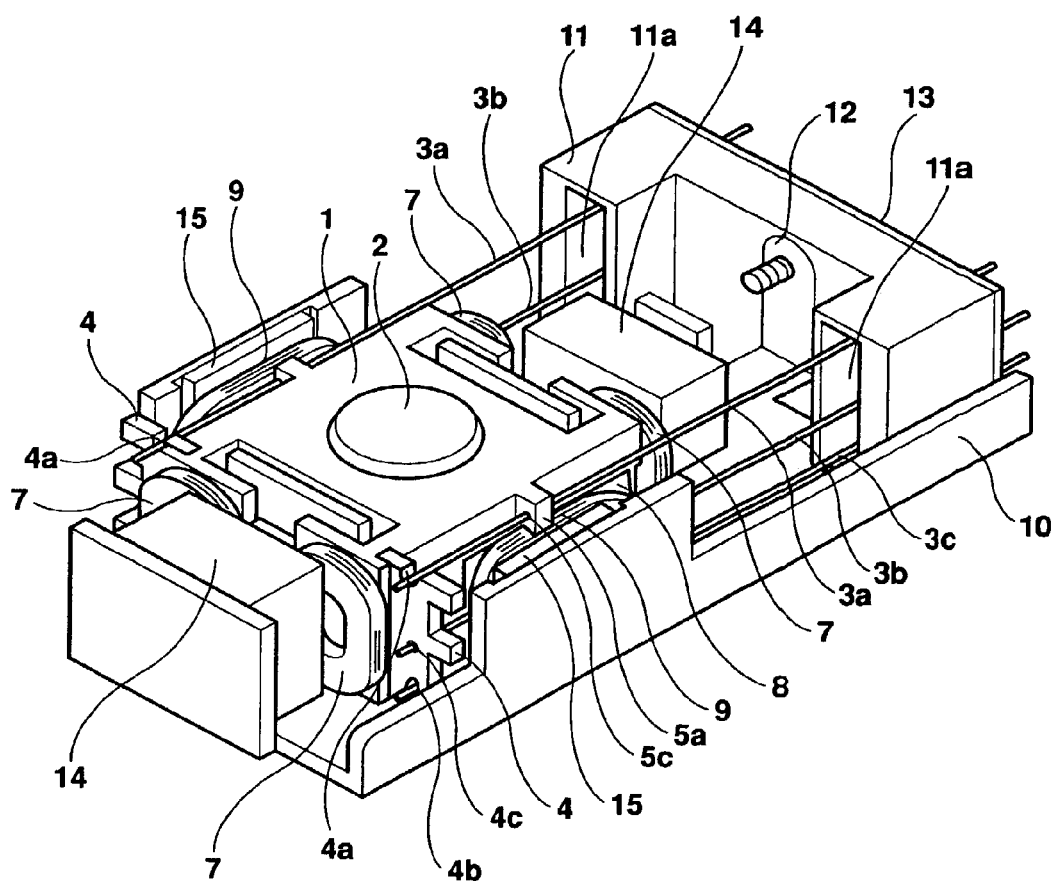
FIG. 1 is a perspective diagram showing an actuator according to the present invention in a condition wherein assembly is complete.
Figure 2:
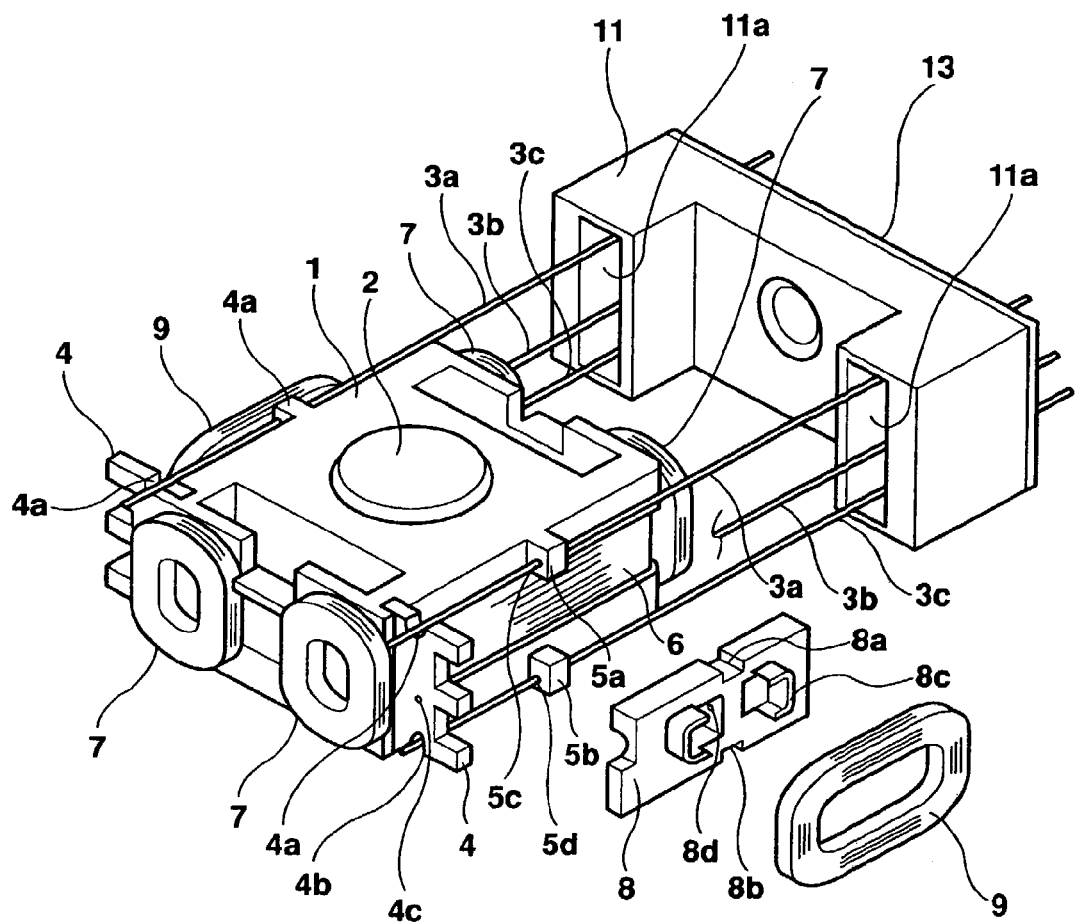
FIG. 2 is a development perspective diagram showing a development condition wherein the magnetic circuit section and a portion of the suspension wires shown in FIG. 1 are not shown.
Figure 3:
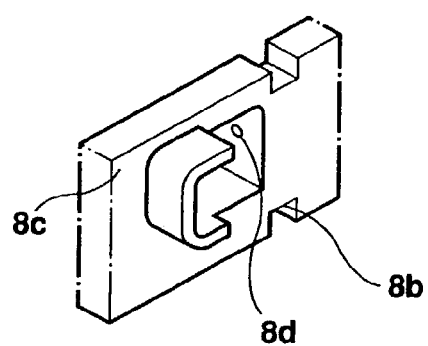
FIG. 3 is a diagram showing details of a tilt bobbin shown in FIG. 2.
Figure 4:
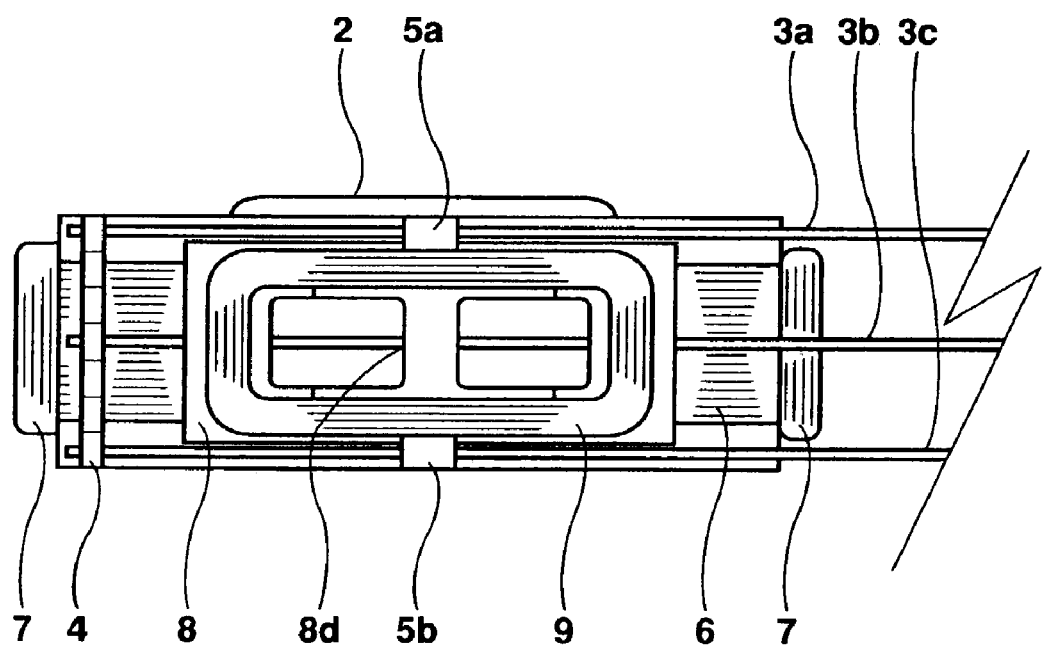
FIG. 4 is a plan view of significant sections for explaining a suspension bridging device of the actuator according to the present invention.

FIG. 1 is a perspective diagram showing a displacement actuator according to the present invention after its assembly has been completed. FIG. 2 is a development perspective view showing a development of placement of a tilt actuator of the displacement actuator which includes a tilt coil a tilt coil with a section of a magnetic circuit and a portion of the suspension wires shown in FIG. 1 not shown. FIG. 4 is a plan view of the important sections showing a condition where the tilt coil is attached to the lens holder.

An objective lens 2 is mounted on a lens holder 1. Suspension wires 3a, 3b, and 3c are fixed to both a right side surface and a left side surface of the lens holder 1. The lens holder 1 comprises retention members 4 on one end in a direction of extension of the suspension wires 3a, 3b, and 3c. Each retention member 4 has U-shaped sections 4a and 4b which are U-shaped channels respectively on the upper and lower ends and a retention hole 4c near the center of the retention member 4. The suspension wires 3a and 3c are soldered to the U-shaped sections 4a and 4b and the suspension wire 3b is soldered to the retention hole 4c. In addition, a printed-circuit board (not shown) is affixed to the retention member 4 and one end of a drive coil of the displacement actuator (which may comprise a focusing coil, a tracking coil, or a tilt coil, described hereafter) is connected to the printed-circuit board.

The lens holder 1 also comprises projections 5a and 5b which are integrally formed with the lens holder on positions corresponding to the U-shaped sections 4a and 4b and in a central section, in a direction of extension of the suspension wires, on both the right and left side surfaces of the lens holder. Fixing holes 5c and 5d to which the suspension wires 3a and 3c are to be inserted are provided in the projections 5a and 5b, respectively.

The displacement actuator also has a focusing actuator which includes a focusing coil 6 formed by winding a conductive line to surround the periphery of the side surfaces of the lens holder 1 and four tracking coils 7 placed on both corners in the front end surface and in rear end surface of the lens holder 1 are provided on the lens holder 1, the front and rear end surfaces being perpendicular to the extension direction of the suspension wires. Moreover, tilt bobbins 8 are provided on both side surfaces of the lens holder 1 onto which the suspension wires 3a, 3b, and 3c are fixed.

Recesses 8a and 8b matching the projections 5a and 5b provided on the lens holder 1 are provided on the upper and lower surfaces of the tilt bobbin 8, respectively. The tilt bobbin 8 is fixed to the lens holder 1 by adhering these projections 5a and 5b and the recesses 8a and 8b. A tilt coil 9 is wound around a winding section 8c on the external surface of the tilt bobbin 8. A supporting hole 8d is provided on a position corresponding to the retention hole 4c on the central section in the vertical direction. The suspension wire 3b is inserted into and fixed to the supporting hole 8d through adhesion using an adhesive.

A base 10 is made of a steel plate and forms a portion of the housing. Various components are attached to the base 10. A fixing member 11 is fixed by a screw to a mounting member 12 which is integrally formed with the base 10. In addition, the fixing member 11 supports the other ends of six suspension wires 3a, 3b, and 3c each having one end fixed to one of the side surface of the lens holder. Moreover, a printed-circuit board 13 is adhered and fixed to the fixing member 11 for soldering the suspension wires 3a, 3b, and 3c. A space section 11a is formed on the fixing member 11 through which the suspension wires 3a, 3b, and 3c penetrate. The space section 11a is filled with a damping agent so that the suspension wires can be damped by the damping agent.

Tracking magnets 14 are placed to oppose the tracking coils 7 placed on the front and rear end surfaces of the lens holder 1. The tracking magnets 14 together with the tracking coils 7 form a tracking actuator of the displacement actuator. The tracking magnets 14 are placed in orientations such that the surfaces having the same polarity oppose each other. Similarly, tilt magnets 15 are placed to oppose the tilt coils 9 and in orientations such that the surfaces having the same polarity oppose each other. The tracking magnets 14 and the tilt magnets 15 are respectively attached by an adhesive to an L-shaped section which is integrally formed with the base 10.

Significant steps of a method for assembling the structure of the present embodiment will now be described. First, a focusing coil 6, tracking coils 7, and retention members 4 are attached to the main body of the lens holder 1 in designated positions. Then, tilt bobbins 8 onto which tilt coils 9 are wound are positioned by fitting the recesses 8a and 8b of the tilt bobbin 8 with the projections 5a and 5b of the lens holder and are adhered to the lens holder.

To this structure, each of the suspension wires 3a is inserted into a corresponding fixing hole 5c using a jig, positioned at a U-shaped section 4a, and adhered to the fixing hole 5c and to the U-shaped section 4a by an adhesive. Similarly, a suspension wire 3c is inserted into a fixing hole 5d by a jig, positioned at a U-shaped section 4b, and is fixed to the fixing hole 5d and to the U-shaped section 4b through soldering.

A suspension wire 3b is inserted by a jig into a supporting hole 8d provided on a tilt bobbin 8 and a retention hole 4c, and is fixed to the supporting hole 8d and the retention hole 4c through soldering. In this process, the suspension wire 3b and the tilt coil 9 are electrically connected. The other ends of the suspension wires 3a, 3b, and 3c are inserted by a jig into holes (not shown) provided on a printed-circuit board 13 through a space section 11a provided on a fixing member 11, and the holes are soldered so that a bridged section is completed.

As described, the suspension wires can be bridged in the central sections of the side surfaces of the lens holder, which is advantageous in stably supporting the lens holder. In addition, power can be supplied to the tilt coils through the suspension wires.

By fixing the tilt bobbin to the lens holder by fitting the projections on the upper and lower portions of both side surfaces of the lens holder and recesses on the upper and lower portions of the tilt bobbin and by fixing the suspension wires after fixing the bobbins, it is possible to easily position the tilt coils in designated positions with respect to the lens holder. Moreover, it is possible to secure new portions which can reliably support the suspension wires.

What is claimed is:

1. An optical head comprising:
a lens holder supported in a displaceable manner with respect to a housing;
a displacement actuator having a magnet and a drive coil, for displacing the lens holder, the displacement actuator having a focusing actuator, a tracking actuator and a tilt actuator, and the drive coil having a focusing coil, a tracking coil and a tilt coil;
the focusing actuator including a magnet and the focusing coil;
the tracking actuator including a magnet and the tracking coil;
the tilt actuator including a magnet and the tilt coil;
a plurality of first suspension wires bridged over and fixed to two side surfaces of the lens holder and the housing;
a plurality of bobbins for holding the drive coil and having the tilt coil wound therearound and which are fixed to the side surfaces to which the first suspension wires are fixed, and
a plurality of second suspension wires bridged over and fixed to the bobbins and the housing;
the first and second suspension wires supporting the lens holder at two points including central and end portions thereof.

2. An optical head according to claim 1, wherein
a pair of projections are formed on each of the two side surfaces of the lens holder in positions pinching the bobbin; and
a pair of recesses into which fit the projections are formed on each of the bobbins.

3. An optical head according to claim 2, wherein
each of the second suspension wires is fixed to the bobbin after the bobbin is fixed to the lens holder.

4. An optical head according to claim 1, wherein
the bobbin is fixed external to the focusing coil which is directly provided on the lens holder.

5. An optical head according to claim 1, wherein
each of the second suspension wires supplies power for operating the actuator to the tilt coil formed on the bobbin to which the second suspension wire is to be fixed.

* * * * *